Jan. 12, 1971 W. E. HICKS 3,553,875

CALL INDEX FOR TELEPHONES

Filed Oct. 9, 1968 2 Sheets-Sheet 1

William E. Hicks
Inventor.
Koenig, Senniger,
Powers and Leavitt,
Attorneys.

CALL INDEX FOR TELEPHONES

Filed Oct. 9, 1968 2 Sheets-Sheet 2

United States Patent Office 3,553,875
Patented Jan. 12, 1971

3,553,875
CALL INDEX FOR TELEPHONES
William E. Hicks, 4250 Galt Ocean Drive,
Fort Lauderdale, Fla. 33308
Filed Oct. 9, 1968, Ser. No. 766,208
Int. Cl. C09f 3/06
U.S. Cl. 40—336 2 Claims

ABSTRACT OF THE DISCLOSURE

A transparent plastic window member is provided, being shaped as a sloping tongue for reception in a sloping recess in a telephone base. Spring clip means is provided at one end of the tongue for forming a quick-detachable connection with the sides of the elevated central portion of such a base. Provided also is a paper reminder slip having the same outline as the tongue to be held thereby in said recess. Outdated reminder slips may be conveniently removed and replaced by removing and replacing the windowpiece. Both the windowpiece and reminder slip are so located that, when the receiver of the telephone is removed, the slip is visible through the window member but when the receiver is in place the slip becomes substantially hidden.

BACKGROUND OF THE INVENTION

Various schemes have been suggested for providing reminders of needed telephone information, see for example U.S. Pats. 2,741,860 and 2,990,639. It is generally desirable for aesthetic reasons that the information be unseen when not in use. Thus, for example, slide means have been used underneath older telephone bases for receiving and exposing when needed parts containing the needed information. However, these arrangements have been somewhat complex and inapplicable to certain modern telephone equipment. By means of the invention a blank of substantial area is provided for a substantial amount of information.

SUMMARY OF THE INVENTION

An object of the invention is to provide convenient one-piece means for holding a replaceable reminder slip of considerable area on a modern telephone base, which will expose the slip when a telephone receiver is removed and which will allow it to be substantially hidden when the receiver is replaced. Another object is to provide quick-detachable means for the device whereby an obsolete slip may be removed and replaced by an up-to-date one.

BRIEF DESCRIPTION OF THE DRAWINGS

Similar reference characters indicate corresponding parts throughout the drawings.

Referring to FIGS. 1 and 2, numeral 1 designates a modern telephone base which among other things forms a cradle for a receiver 3. The base 1 has an elevated central portion 5 located between a downwardly sloping and convexly curved recess 7 for the mouthpiece 9 of the receiver 3. On the other side of the raised portion 5 is a recess 11 for the earpiece 14 of the receiver 3. In the recess 11 is a switch control bar 15 which is engaged by the earpiece 13 when in the recess 11. The receiver is prepared for operation when the receiver is lifted from the base. Wiring for the parts 1 and 3 is not shown, being unnecessary to a description of the invention. The receiver has an arch form.

Referring to FIGS. 4 and 5, numeral 17 in general indicates the transparent windowpiece which is shaped with a sloping, curved tongue 19. The curvature is such as to fit the convex shape of the bottom of the recess 7 in the base 1. At its broader end the tongue 9 is terminated by a transverse band 21 having perpendicular integral ears 23. These provide spring clip means engageable with sides 25 of the base 1 for making quick-attachable and detachable connections therewith.

Referring to FIG. 6 there is shown a blank paper memorandum slip 29 having a tongue shape 25 matching that of the tongue 19 and terminated by a transverse portion 27 which will underlie the band 21. Thus, with the windowpiece 17 removed from the base 1, one of the paper slips may be laid in the recess 7 and then the windowpiece 17 clipped to the sides 25 of the raised portion 5 of the base 1. This holds the tongue 19 in position in the recess 7. As indicated in FIG. 6, the blank slip is printed to indicate entries to be made of information desired by the telephone user.

Figure 1:
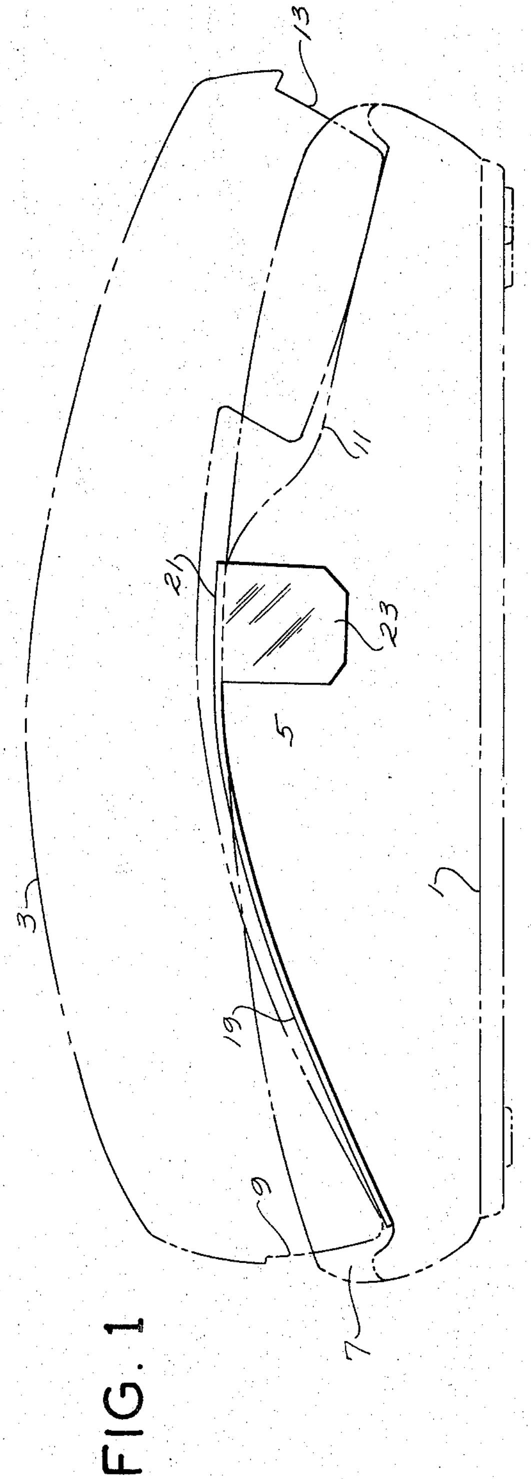
FIG. 1 is a side elevation of the device shown in position on a conventional modern telephone base, the latter being shown in dot-dash lines.
Figure 2:
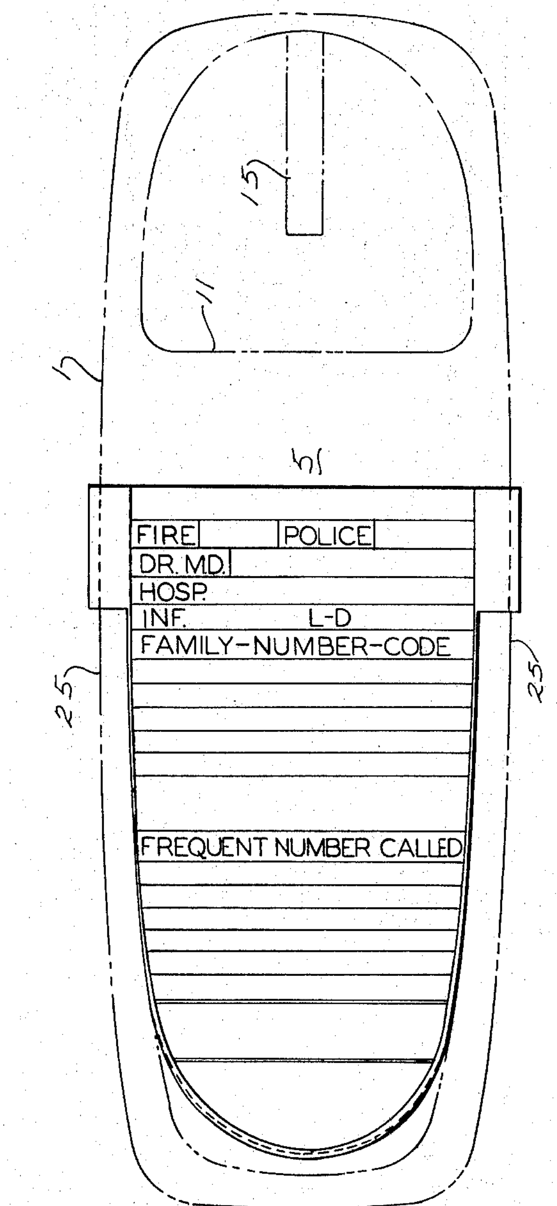
FIG. 2 is a plan view of FIG. 1.
Figure 6:
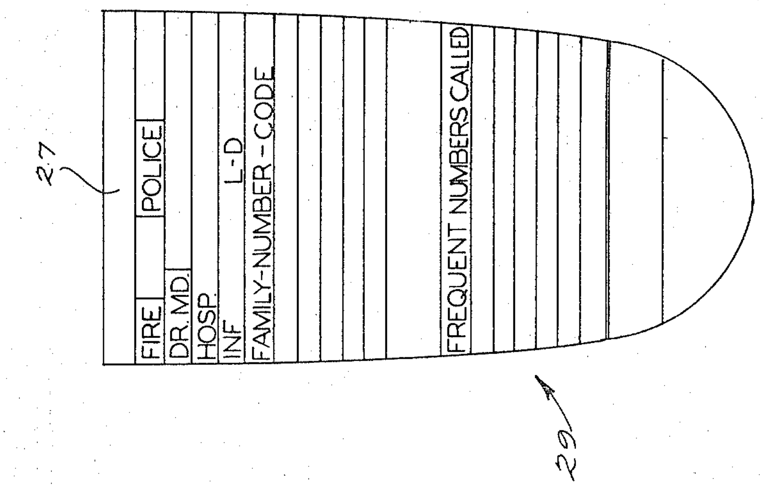
FIG. 6 is a plan view of a reminder slip used in connection with the window member.
Figure 5:
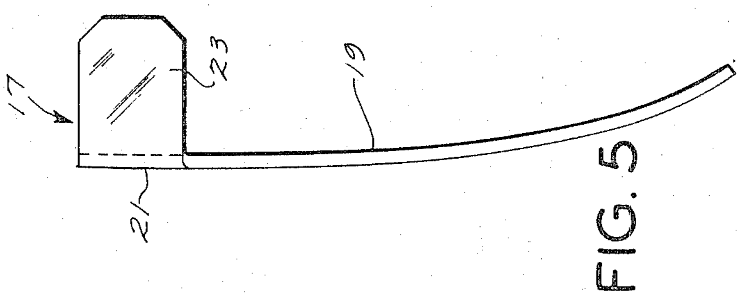
FIG. 5 is a right-side elevation of FIG. 3.
Figure 4:
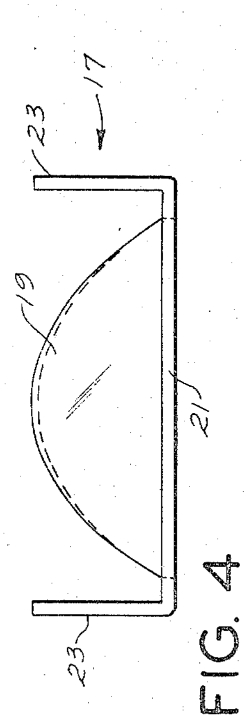
FIG. 4 is a top plan view of FIG. 3.
Figure 3:
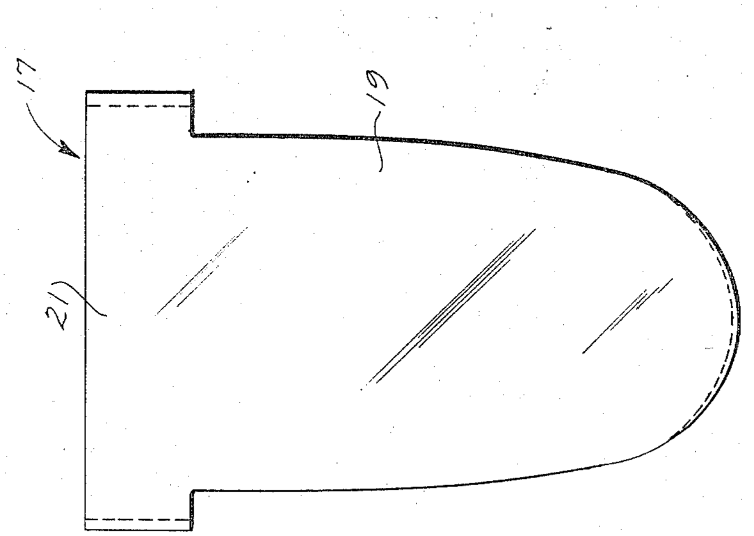
FIG. 3 is a plan view of the transparent window member made according to the invention.

The slips 29 may be made up in pads of a number of them marginally glued along the outside of the portion 27 to function as tear sheets so that as new ones are needed from time to time they may be torn from a pad. A fresh one properly updated is inserted under the windowpiece 17 after an outdated slip has been removed.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

What is claimed is:

1. A transparent springy plastic windowpiece for holding a remainder slip in a receiver-recess of a telephone base, comprising a curved tongue, one end of said tongue being terminated by a transverse portion, the lateral ends of said transverse portion being formed as springy ears extending normally with respect to the transverse portion for quick-detachable and attachable connection with an elevated central portion of the base.

2. Apparatus for use in connection with a telephone having a base with a curved recess on one side of an elevated central portion and an arch form of receiver adapted to be supported on the base and extend over the recess, comprising a transparent plastic windowpiece having an elongate curved and sloping tongue portion to fit into and rest in said curved recess, said windowpiece having means at one end for forming a quick-attachable and detachable connection with said elevated central portion of the base, a paper or like reminder slip bearing indicia for insertion of desired telephone information, said slip having an elongate tongue shape also to fit into and rest in said curved recess and to register under the tongue portion of the windowpiece, whereby information on the slip in the recess is exposed to view through the tongue of the windowpiece when the receiver is lifted from the base but substantially covered by the receiver when the receiver is supported on the base.

References Cited

UNITED STATES PATENTS

| | | | |
|---|---|---|---|
| 2,408,194 | 9/1946 | Bourdiius | 40—336X |
| 3,395,257 | 7/1968 | Clark | 40—336 |

FOREIGN PATENTS

| | | | |
|---|---|---|---|
| 529,450 | 6/1955 | Italy | 40—320 |

JEROME SCHNALL, Primary Examiner

L. R. OREMLAND, Assistant Examiner